United States Patent
Shishido et al.

(10) Patent No.: US 9,045,138 B2
(45) Date of Patent: Jun. 2, 2015

(54) VEHICLE CONTROL APPARATUS

(71) Applicant: AISIN SEIKI KABUSHIKI KAISHA, Kariya-shi (JP)

(72) Inventors: Yo Shishido, Nisshin (JP); Takeshi Tojo, Kariya (JP); Takahiro Misu, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/208,301

(22) Filed: Mar. 13, 2014

(65) Prior Publication Data

US 2014/0277886 A1 Sep. 18, 2014

(30) Foreign Application Priority Data

Mar. 15, 2013 (JP) .................................. 2013-054048

(51) Int. Cl.
*B60W 20/00* (2006.01)
*B60W 10/02* (2006.01)
(Continued)

(52) U.S. Cl.
CPC ............... *B60W 20/40* (2013.01); *B60W 10/02* (2013.01); *B60W 10/06* (2013.01); *B60W 10/08* (2013.01); *Y10S 903/93* (2013.01); *Y10S 903/946* (2013.01); *B60K 6/48* (2013.01); *B60W 20/00* (2013.01); *B60W 2510/083* (2013.01); *B60W 2520/105* (2013.01); *B60W 2520/28* (2013.01);
(Continued)

(58) Field of Classification Search
CPC ..... B60W 20/40; B60W 10/06; B60W 10/08; B60W 20/00; B60W 10/02; B60W 2510/083; B60W 2520/28; B60W 2540/10; Y02T 10/6286; Y02T 10/7077; Y02T 10/6221; Y10S 903/93; Y10S 903/946

USPC .................. 701/22, 51; 903/902, 930, 946; 180/65.265, 65.275; 475/150; 477/5
See application file for complete search history.

(56) References Cited

U.S. PATENT DOCUMENTS

| | | | |
|---|---|---|---|
| 2003/0221883 A1* | 12/2003 | Kubodera et al. ............ | 180/65.2 |
| 2008/0099259 A1* | 5/2008 | Tomo ............................ | 180/65.2 |
| 2012/0253576 A1* | 10/2012 | Tamagawa ...................... | 701/22 |
| 2012/0303301 A1* | 11/2012 | Park .............................. | 702/63 |

FOREIGN PATENT DOCUMENTS

| | | |
|---|---|---|
| EP | 1 366 949 A1 | 12/2003 |
| EP | 1 970 240 A2 | 9/2008 |

(Continued)

OTHER PUBLICATIONS

Extended Search Report issued Jun. 17, 2014 in European Patent Application No. 14157899.7.

*Primary Examiner* — Marthe Marc-Coleman
(74) *Attorney, Agent, or Firm* — Oblon, McClelland, Maier & Neustadt, L.L.P.

(57) ABSTRACT

A vehicle control apparatus includes a determination portion determining whether a vehicle is running by using a motor without using an engine or the vehicle is running by using both of the engine and the motor, a detection portion detecting a start-up request of the engine, a drive power calculation portion calculating a requested drive power in a case where it is detected that the vehicle is running by using the motor without using the engine and the start-up request is detected, and an engine start-up control portion driving a drive shaft by outputting the drive power by means of the motor at a start-up of the engine, the engine start-up control portion causing the vehicle to run by using both of the engine and the motor after the output of the drive power is completed.

14 Claims, 11 Drawing Sheets

(51) Int. Cl.
*B60W 10/06* (2006.01)
*B60W 10/08* (2006.01)
*B60K 6/48* (2007.10)

(52) U.S. Cl.
CPC ......... *B60W2540/10* (2013.01); *Y02T 10/7077* (2013.01); *Y02T 10/6221* (2013.01); *Y02T 10/6286* (2013.01)

(56) References Cited

FOREIGN PATENT DOCUMENTS

| | | |
|---|---|---|
| JP | 2012-131497 | 7/2012 |
| WO | WO 2006/129853 A1 | 12/2006 |

\* cited by examiner

VEHICLE CONTROL APPARATUS

CROSS REFERENCE TO RELATED APPLICATIONS

This application is based on and claims priority under 35 U.S.C. §119 to Japanese Patent Application 2013-054048, filed on Mar. 15, 2013, the entire content of which is incorporated herein by reference.

TECHNICAL FIELD

This disclosure generally relates to a vehicle control apparatus.

BACKGROUND DISCUSSION

At a hybrid vehicle which is configured to run in a motor running mode where the vehicle runs only on a motor and in a hybrid running mode where the vehicle runs on both an engine and the motor while switching the motor running mode and the hybrid running mode to each other, a technique is known in which, in a case where the mode transits from the motor running mode to the hybrid running mode, a clutch provided between the motor and the engine is engaged and thus the engine is started up by the motor that is used to run the vehicle. Thus, according to the known technique, the engine is started up without additionally providing, for example, a starter motor. Related to such a known technique, a technique is also known where, in a case where a drive power requested by a driver increases and the engine is brought to be started, rotation speed of the engine is increased quickly by releasing a clutch which is provided between the motor and a vehicle drive shaft for connecting and disconnecting the motor and the vehicle drive shaft relative to each other as described in, for example, JP2012-131497A (hereinafter referred to as Patent reference 1).

According to the known technique described in Patent reference 1, however, the clutch is released and thus the vehicle drive shaft is disconnected from the motor at a time point when the requested drive power increases and the engine is brought to be started. Accordingly, the drive power is not transmitted from when the driver presses on an accelerator until when the clutch is engaged again. Consequently, according to the known technique, it is difficult to make an appropriate and accurate response to the driver's request for running the vehicle.

In addition, according to the known technique, at a start-up of the engine, the clutch is allowed to slide and thus the drive power is restricted from changing, which may heat up the clutch and may cause a failure. Consequently, according to the known technique, a high cooling performance needs to be provided in order to prevent the clutch from being heated.

A need thus exists for a vehicle control apparatus which is not susceptible to the drawback mentioned above.

SUMMARY

According to an aspect of this disclosure, a vehicle control apparatus includes a determination portion determining whether a vehicle is running by using a motor as a power source without using an engine or the vehicle is running by using both of the engine and the motor as the power source, on the basis of an operation status of the engine, a detection portion detecting a stark-up request of the engine, a drive power calculation portion calculating a requested drive power in a case where it is detected that the vehicle is running by using the motor as the power source without using the engine and the start-up request of the engine is detected, and an engine start-up control portion driving a drive shaft by outputting the drive power by means of the motor at a start-up of the engine, the engine start-up control portion rotating the engine and causing the vehicle to run by using both of the engine and the motor as the power source after the output of the drive power is completed.

According to another aspect of this disclosure, a vehicle control apparatus includes a drive power calculation portion calculating a drive power in a case where a start-up request of an engine is generated when a vehicle is running by using only a motor as a power source, and an engine start-up control portion driving a drive shaft by outputting the drive power by means of the motor at a start-up of the engine, the engine start-up control portion rotating the engine and causing the vehicle to run by using both of the engine and the motor as the power source after the output of the drive power is completed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a vehicle control apparatus disclosed here will be described hereunder with reference to the accompanying drawings. In the embodiments described below, a hybrid vehicle mounted with the vehicle control apparatus is described as an example.

Figure 1:
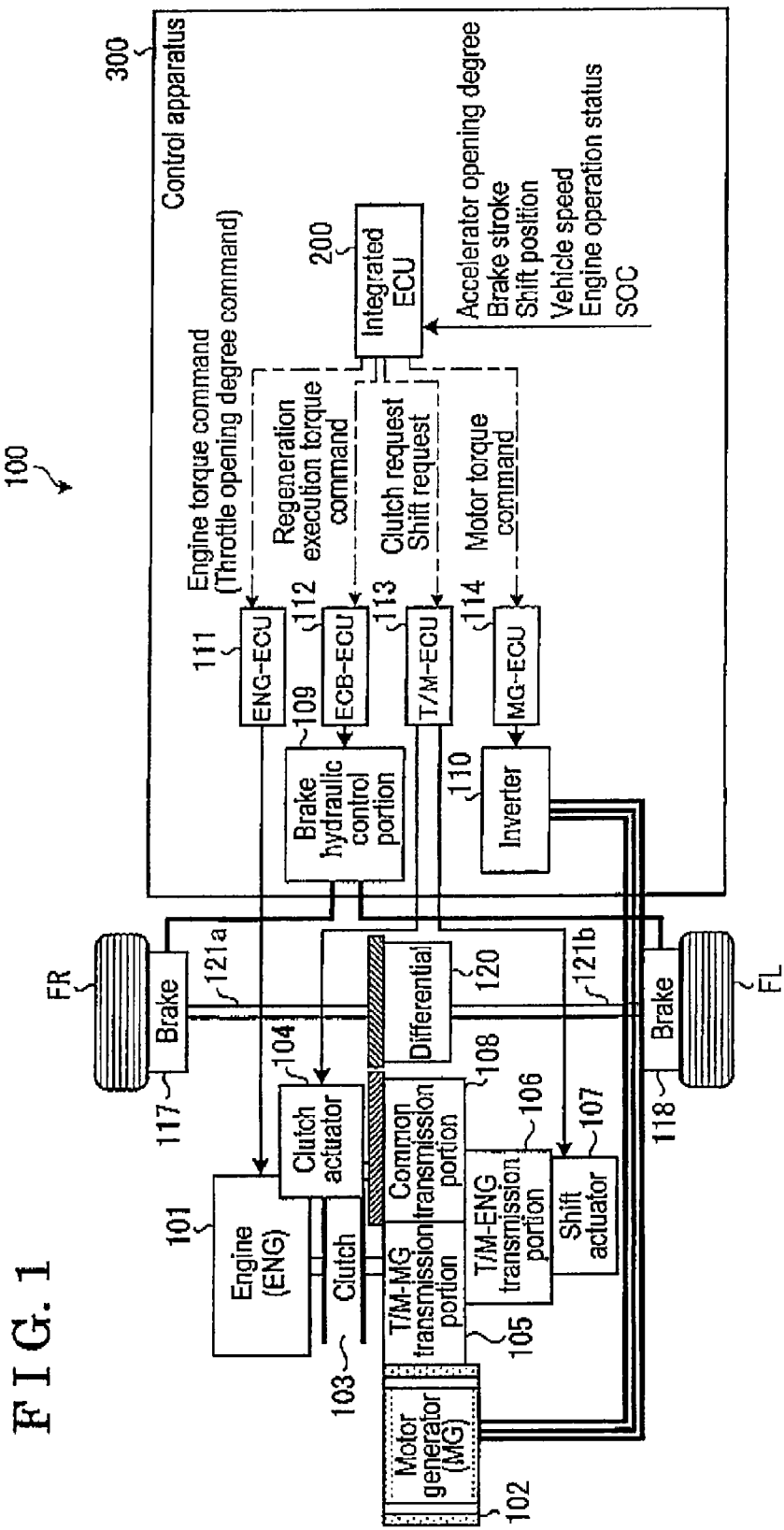
FIG. 1 is a configuration diagram of a hybrid vehicle of a first embodiment disclosed here.

A first embodiment disclosed here will be described. As illustrated in FIG. 1, a hybrid vehicle 100 (i.e., a vehicle) of this embodiment is a front-wheel drive vehicle and includes, as a power source, an engine (ENG) 101 and a motor generator (MG) 102 (i.e., a motor). The engine 101 outputs a rotative power (torque) by combustion energy derived from burning fuel and the motor generator 102 outputs a rotative power (torque) by electrical energy. The hybrid vehicle 100 of this embodiment includes a drivetrain and a control apparatus 300.

The hybrid vehicle 100 of this embodiment includes a right front wheel FR (driving wheel) and a left front wheel FL (driving wheel), as the drivetrain. The hybrid vehicle 100 includes drive shafts 121a, 121b and a differential 120, as a drive shaft. The hybrid vehicle 100 also includes the engine 101, the motor generator 102, a clutch 103, a clutch actuator 104, a transmission portion 105, 106, 108 (a T/M-MG transmission portion 105, a T/M-ENG transmission portion 106, a common transmission portion 108) and a shift actuator 107.

The engine 101 is an internal combustion engine which, for example, burns the fuel (for example, hydrocarbon system fuel including, gasoline, light oil and the like) and outputs the torque from an engine output shaft thereof. The engine 101 includes various sensors (for example, an engine rotation sensor) and various actuators (for example, actuators actuating an injector and a throttle valve). The engine 101 is connected to an engine ECU (ENG-ECU) 111 so as to be communicable with each other, and is controlled by the engine ECU 111.

The clutch 103 is provided between the engine 101, and the transmission portion 105, 106, 108, the motor generator 102. The clutch 103 may transmit and stop transmitting the torque from the engine 101 to the transmission portion 105, 106, 108. The clutch 103 is controlled to engage and disengage, that is, to engage and release, by the clutch actuator 104 of which actuation is controlled by a transmission ECU (T/M-ECU) 113.

The motor generator 102 is a synchronous generator motor which drives as an electric motor and drives as an electric generator. The motor generator 102 includes a rotor with permanent magnets embedded therein, and a stator on which a stator coil wounded. The motor generator 102 exchanges electric power with a battery via an inverter 110. Specifically, the motor generator 102 generates electric power by using the rotative power outputted from the engine 101 to the engine output shaft and charges the battery. The motor generator 102 executes regeneration by using the torque from the T/M-MG transmission portion 105 and charges the battery. In addition, the motor generator 102 outputs the torque to the T/M-MG transmission portion 105 by use of the electric power from the battery.

The transmission portion 105, 106, 108 is a mechanism which transmits the torque outputted from the motor generator 102 and/or the engine 101 to the driving wheels FR, FL via the drive shaft (the differential 120 and the drive shafts 121a, 121b). The transmission portion 105, 106, 108 is formed by the T/M-MG transmission portion 105, the T/M-ENG transmission portion 106 and the common transmission portion 108. The T/M-MG transmission portion 105 is a mechanism that changes a speed of the rotative power outputted from the motor generator 102 and transmits the rotative power to the driving wheels FR, FL via the drive shaft (the differential 120 and the drive shafts 121a, 121b). The T/M-ENG transmission portion 106 is a mechanism that changes a speed of the torque outputted from the engine output shaft of the engine 101 and transmits the torque to the driving wheels FR, FL via the drive shaft (the differential 120 and the drive shafts 121a, 121b). The common transmission portion 108 is a mechanism that changes the speeds of the torques outputted from both of the motor generator 102 and the engine 101 and transmits the torque to the driving wheels FR, FL via the drive shaft (the differential 120 and the drive shafts 121a, 121b). Each of these transmission portions is configured to be changed or shifted to plural gear stages.

Next, the control apparatus 300 (i.e., a vehicle control apparatus) of the hybrid vehicle 100 will be described. The control apparatus 300 controls the whole hybrid vehicle 100. As illustrated in FIG. 1, the control apparatus 300 mainly includes the inverter 110, a brake hydraulic control portion 109, the engine ECU (ENG-ECU) 111, an electronic control brake ECU (ECB-ECU) 112, the transmission ECU (T/M-ECU) 113, a motor generator ECU (MG-ECU) 114 and an integrated ECU 200.

The engine ECU (ENG-ECU) 111 is connected to the various actuators (for example, the actuators actuating the throttle valve, the injector and so forth) which are built in the engine 101, to the various sensors (for example, the engine rotation sensor), and to the integrated ECU 200 so as to be communicable therewith. The engine ECU (ENG-ECU) 111 receives an engine torque command (an accelerator opening degree command, that is, a throttle opening degree command) from the integrated ECU 200 and controls operation of the engine 101.

The electronic control brake ECU (ECB-ECU) 112 is electrically connected to the brake hydraulic control portion 109 and to the integrated ECU 200. The electronic control brake ECU 112 receives a regeneration execution torque command from the integrated ECU 200 and executes a command to the brake hydraulic control portion 109, thereby executing a brake control by an Electronically Control Braking System (ECB) which is an example of a brake-by-wire system.

The brake hydraulic control portion 109 receives the command from the ECB-ECU 112 and executes a brake hydraulic control for a brake 117, 118. Thus, the brake is operated relative to the driving wheels automatically according to a vehicle status.

The transmission ECU (T/M-ECU) 113 is electrically connected to the clutch actuator 104, the shift actuator 107 and the integrated ECU 200. The transmission ECU 113 receives a clutch request from the integrated ECU 200 and controls the clutch actuator 104, and thus controls the engagement and disengagement of the clutch 103. In addition, the transmission ECU 113 receives a shift request from the integrated ECU 200 and controls the shift actuator 107, and thus controls the change or switching of the gear stages of the T/M-MG transmission portion 105, the T/M-ENG transmission portion 106 and the common transmission portion 108.

The inverter 110 generates a three-phase alternating current in accordance with a control signal from the motor generator ECU (MG-ECU) 114 and applies the current to the motor generator 102, and thus controls operations (a drive operation, an electric power generation operation and a regeneration operation) of the motor generator 102. The inverter 110 is electrically connected to the battery via a step-up converter or a boost converter.

The motor generator ECU (MG-ECU) 114 is connected to the inverter 110, to the various sensors (for example, a rotation sensor) and to the integrated ECU 200 so as to be communicable therewith. The motor generator ECU 114 receives a motor torque command from the integrated ECU 200 and controls the operation of the motor generator 102 via the inverter 110.

Here, at each of the engine ECU 111, the electronic control brake ECU 112, the transmission ECU 113 and the motor generator ECU 114, Central Processing Unit (CPU) reads out a predetermined program (including a data base, a map) from a storage medium including, for example, Read Only Memory (ROM), and executes the read-out program in accordance with a control signal from the integrated ECU 200. Thus, the CPU executes the above-described controls.

The integrated ECU 200 controls the operations of the engine ECU 111, the electronic control brake ECU 112, the transmission ECU 113 and the motor generator ECU 114. The integrated ECU 200 is connected to the engine ECU 111, the electronic control brake ECU 112, the transmission ECU 113, the motor generator ECU 114, the various sensors (for example, the engine rotation sensor) and various switches (for example, an ignition switch) so as to be communicable therewith. In this embodiment, the integrated ECU 200 receives an accelerator opening degree from an accelerator opening sensor and receives a vehicle speed of the hybrid vehicle 100 from a vehicle speed sensor. In addition, the integrated ECU 200 receives an operation status of the engine 101 from the engine ECU 111. Further, the integrated ECU 200 receives a brake stroke, a shift position, and a state of charge (SOC) from a brake stroke sensor, a shift lever, and the battery, respectively.

Figure 2:
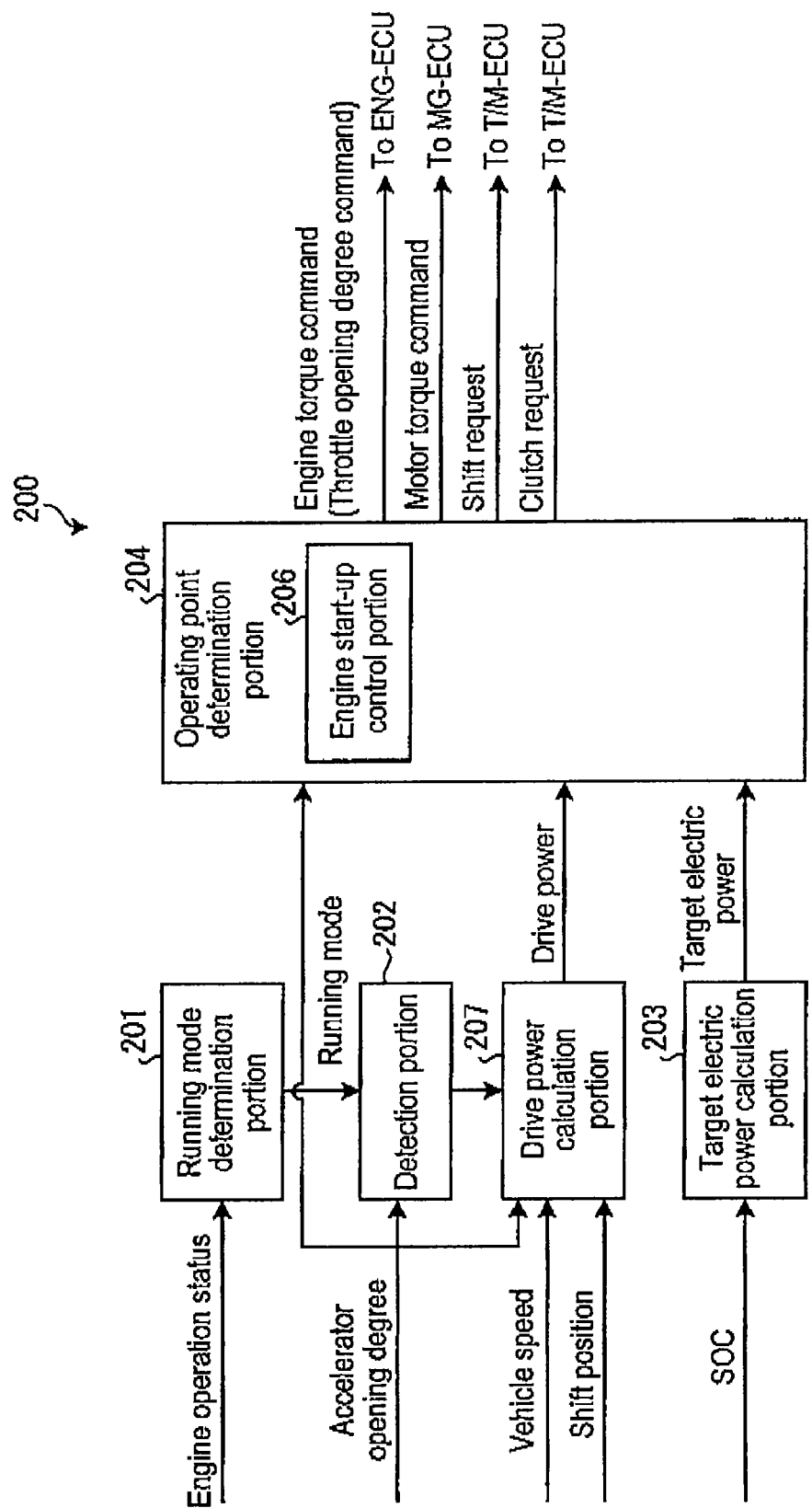
FIG. 2 is a block diagram illustrating a functional configuration of an integrated ECU of the first embodiment.

The integrated ECU 200 will be described hereunder in detail. As illustrated in FIG. 2, the integrated ECU 200 mainly includes a running mode determination portion 201 (i.e., a determination portion), a detection portion 202, a drive power calculation portion 207, a target electric power calculation portion 203, and an operating point determination portion 204.

At the integrated ECU 200, according to a predetermined status of the hybrid vehicle 100, Central Processing Unit (CPU) reads out a predetermined program (including a data base, a map) from a storage medium including, for example, ROM, and executes the read-out program, and thus functions as each of the above-described portions. At the integrated ECU 200, the CPU executes below-mentioned function of each of the portions, and outputs various control signals to the engine ECU 111, the electronic control brake ECU 112, the transmission ECU 113 and the motor generator ECU 114.

The running mode determination portion 201 inputs the operation status of the engine 101 from the engine ECU 111 and determines the running mode of the hybrid vehicle 100 from the inputted operation status of the engine 101. A motor running mode (which will be hereinafter referred to as "EV running mode") corresponds to a running mode in which the hybrid vehicle 100 runs by using only the motor generator 102 without using the engine 101 as the power source in a disengaged state of the clutch 103, that is, the hybrid vehicle 100 is powered only by the motor generator 102. A hybrid running mode (which will be hereinafter referred to as "HV running mode") corresponds to a running mode in which the hybrid vehicle 100 runs by using both of the engine 101 and the motor generator 102 as the power source in an engaged state of the clutch 103, that is, the hybrid vehicle 100 is powered by both of the engine 101 and the motor generator 102. The running mode determination portion 201 transmits the determined running mode to the detection portion 202. In addition, the running mode determination portion 201 detects that the hybrid vehicle 100 is stopped on the basis of, for example, the vehicle speed. Here, the running mode of this embodiment includes the motor running mode and the hybrid running mode.

The detection portion 202 detects a start-up request of the engine 101. In this embodiment, from the accelerator opening sensor, the detection portion 202 inputs the accelerator opening degree provided by the driver, that is, an operation amount of the accelerator which is operated by the driver. In a case where the accelerator opening degree is greater than a predetermined first threshold, that means, in a case where the accelerator is largely stepped down by the driver, the detection portion 202 determines that the start-up request of the engine 101 is generated, that is, the start-up of the engine 101 is requested.

In a case where the hybrid vehicle 100 is stopped or the running mode determination portion 201 determines that the hybrid vehicle 100 is running in the EV running mode, and the start-up request of the engine 101 is detected by the detection portion 202, the drive power calculation portion 207 derives the drive power (a requested drive power) that the driver requests by performing the acceleration operation from the accelerator opening degree inputted from the accelerator opening sensor and the vehicle speed inputted from the vehicle speed sensor. From the requested drive power that is derived as described above, the drive power calculation portion 207 calculates the drive power relative to the drive shaft of the hybrid vehicle 100.

Figure 3:
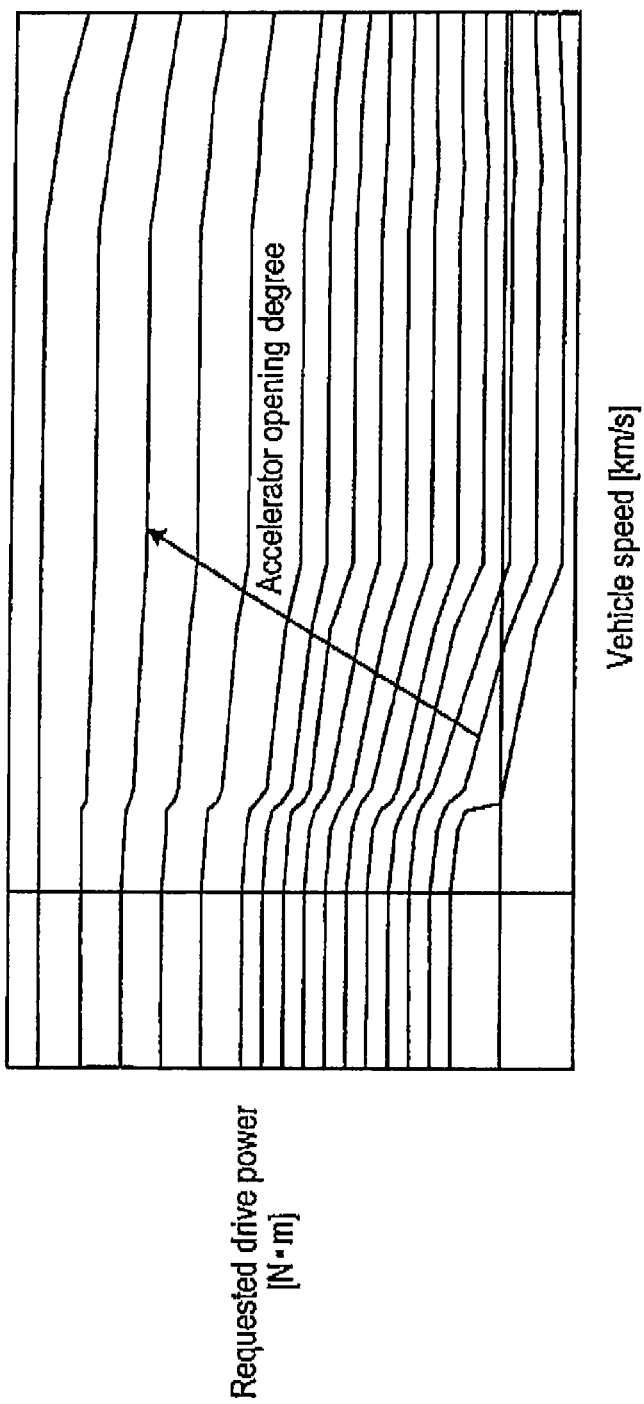
FIG. 3 is a graph showing a relation between a vehicle speed and an accelerator opening degree, and a requested drive power according to the embodiment.

FIG. 3 is a target drive power map showing the relation of the vehicle speed and the accelerator opening degree, relative to the requested drive power. The horizontal axis of the target drive power map represents the vehicle speed and the vertical axis represents the requested drive power. In this embodiment, the target drive power map illustrated in FIG. 3 is stored in the drive power calculation portion 207. On the target drive power map illustrated in FIG. 3, the drive power calculation portion 207 determines the requested drive power, which the driver requests by means of the driving operation, as the requested drive power that corresponds to the inputted accelerator opening degree and to the inputted vehicle speed. Then, the drive power calculation portion 207 calculates the drive power which is based on the requested drive power. The drive power calculation portion 207 transmits the calculated drive power to the operating point determination portion 204.

The target electric power calculation portion 203 inputs the SOC from the battery and calculates a target electric power on the basis of the SOC. The target electric power calculation portion 203 transmits the calculated target electric power to the operating point determination portion 204.

For example, the operating point determination portion 204 derives an engine torque which is targeted by the engine 101, a motor torque which is targeted by the motor generator 102, an engagement capacity which is targeted by the clutch 103 and the gear stage which is targeted by the transmission portion 105, 106, 108, from the accelerator opening degree, the drive power, the target electric power, the running mode, as an operation point achievement target of each of the accelerator opening degree, the drive power, the target electric power, the running mode. As illustrated in FIG. 2, the operating point determination portion 204 includes an engine start-up control portion 206.

At start-up of the engine 101, by transmitting the motor torque command to the motor generator ECU 114, the engine start-up control portion 206 outputs the drive power calculated by the drive power calculation portion 207 so that the drive shaft is driven and the hybrid vehicle 100 is operated. Then, after the output of the drive power is completed (that is, after the hybrid vehicle 100 started to move), the engine start-up control portion 206 transmits the engine torque command (the accelerator opening degree command) to the engine ECU 111 and causes the engine 101 to rotate so that the hybrid vehicle 100 runs in the HV running mode. In this embodiment, the engine start-up control portion 206 sets a timer at a time point of the start-up request of the engine 101, and the engine start-up control portion 206 determines that the output of the drive power is completed when a predetermined time period (a second time period) passes or elapses from the time point of the start-up request of the engine 101.

Figure 4:
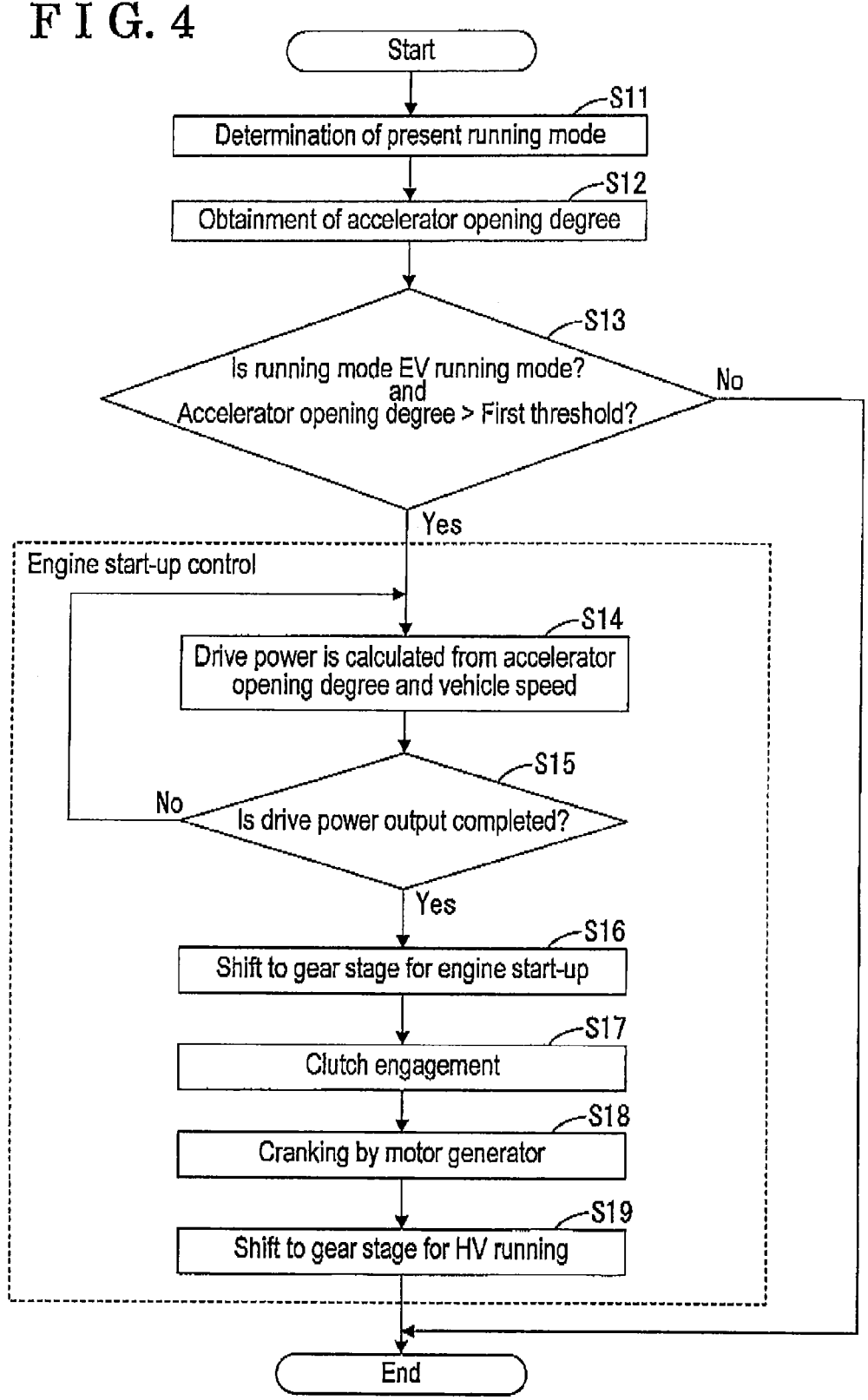
FIG. 4 is a flowchart showing a procedure of a drive control processing according to the first embodiment.
Figure 5:
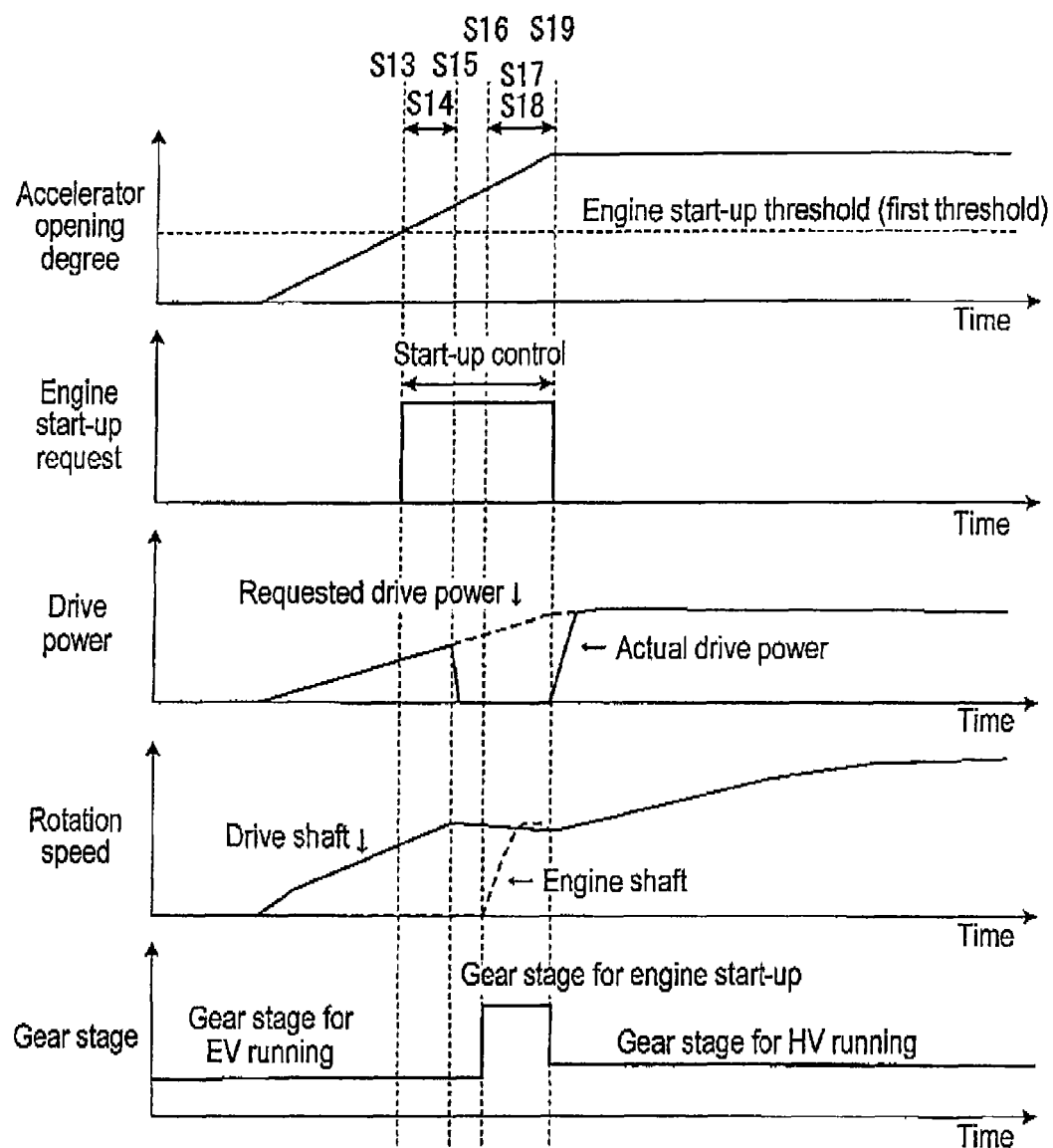
FIG. 5 is a graph showing a status of the accelerator opening degree, an engine start-up request, a drive power, a rotation speed, and a gear stage, at each step of the flowchart of FIG. 4.

Next, a drive control processing of this embodiment, which includes the above-described configuration, will be explained. FIG. 4 is a flowchart showing a procedure of a drive control processing according to the first embodiment. A flowchart of FIG. 4 mainly illustrates a processing related to an engine start-up control. In FIG. 5, the horizontal axis of the graph represents time and the vertical axis represents each of the accelerator opening degree, the engine start-up request, the drive power, the rotation speed and the gear stage.

First, the running mode determination portion 201 determines the present running mode of the hybrid vehicle 100 from the operation status of the hybrid vehicle 100 (Step S11). Then, the detection portion 202 obtains the accelerator opening degree from the accelerator opening sensor (Step S12).

Next, the detection portion 202 determines whether or not the present running mode of the hybrid vehicle 100 is the EV running mode and the accelerator opening degree is greater than the predetermined first threshold (an engine start-up threshold) (Step S13). In a case where the running mode is the EV running mode and the accelerator opening degree is greater than the predetermined first threshold (Step S13: Yes), the detection portion 202 determines that the driver depresses the accelerator deeply and the engine start-up is requested, and hereafter, the start-up control of the engine 101 is started as illustrated in FIG. 5.

On the other hand, in a case where the running mode is the HV running mode or the accelerator opening degree is equal to or smaller than the first threshold (Step S13: No), the driver is not pressing on the accelerator so deeply and the detection portion 202 determines that the engine start-up request is not conducted, and ends the processing.

The engine start-up control will be described hereunder. In a case where the engine start-up request is made, the drive power calculation portion 207 refers to the graph illustrated in FIG. 3 and determines the requested drive power from the accelerator opening degree and the vehicle speed, and then the drive power calculation portion 207 calculates the drive power that is based on the requested drive power (Step S14). The drive power calculation portion 207 outputs the calculated drive power to the engine start-up control portion 206 of the operating point determination portion 204.

The engine start-up control portion 206 receives the drive power outputted from the drive power calculation portion 207, and transmits the motor torque command to the motor generator ECU 114 so that the motor generator 102 is driven at the received drive power. Thus, the drive power is outputted and thus the drive shaft is driven.

The engine start-up control portion 206 determines whether or not the output of the drive power is completed, according to whether or not the predetermined second time period passes from the engine start-up request (Step S15). In a case where the second time period has not passed and the output of the drive power is not completed (Step S15: No), the processing returns to Step S14 and the calculation of the drive power by the drive power calculation portion 207 is repeated. Accordingly, even in a case where the engine start-up is requested, the running mode remains in the EV running mode, that is, the drive shaft continues to be driven only by the motor generator 102, until the output t of the drive power is completed.

On the other hand, at Step S15, in a case where the second time period has passed from the engine start-up request and thus the output of the drive power is completed (Step S15: Yes), the engine start-up control portion 206 transmits the shift request to the transmission ECU 113. Accordingly, as illustrated in FIG. 5, the transmission portion 105, 106, 108, which was at a gear stage for EV running (that corresponds to a gear stage for the EV running mode), is shifted to a gear stage for engine start-up so that the engine 101 and the motor generator 102 are brought to be directly connected to each other (Step S16).

Next, the engine start-up control portion 206 transmits the clutch request to the transmission ECU 113 to cause the clutch 103 to be engaged (Step 617). Here, the engagement capacity of the clutch 103 is an arbitrary engagement capacity. Thus, as illustrated in FIG. 5, the rotation speed of an engine shaft of the engine 101 increases.

Then, the engine start-up control portion 206 transmits the motor torque command to the motor generator ECU 114 to cause the motor generator 102 to perform power running so that the engine 101 is cranked by the motor generator 102 (Step S18).

Next, the engine start-up control portion 206 transmits the shift request to the transmission ECU 113 so that the transmission portion 105, 106, 108 is shifted to the gear stage for HV running that corresponds to the accelerator opening degree and/or the vehicle speed as illustrated in FIG. 5 (Step S19). Here, a gear stage for HV running corresponds to a gear stage that is appropriate for the HV running mode. Accordingly, the engine 101 is started up and the hybrid vehicle 100 comes to run in the HV running mode.

As described above, in this embodiment, in a case where the engine start-up is requested by the driver and the accelerator opening degree comes to be greater than the first threshold when the hybrid vehicle 100 is stopped or is running in the EV running mode, the drive power is calculated from the requested drive power and the drive shaft is driven by the motor generator 102 at the drive power, thereby moving the hybrid vehicle 100. After the output of the drive power is completed, the engine is started up to cause the hybrid vehicle 100 to run in the HV running mode. Accordingly, in a case where the accelerator is depressed and the engine is started up from a state where the hybrid vehicle 100 is stopped or from a state where the hybrid vehicle 100 is running in the EV running mode, the driver's request for running the hybrid vehicle 100, that is, the request related to the running of the vehicle, which is made by the driver, is responded to or met appropriately and accurately.

In addition, in this embodiment, at the start-up of the engine 101, there is no need to restrict a fluctuation of the drive power by causing the clutch 103 to slip. Thus, the clutch 103 is readily prevented from being heated.

A second embodiment disclosed here will be described. In this embodiment, in a case where the engine start-up request is made in the EV running mode, the drive power is increased, immediately before the completion of the output of the drive power.

A configuration of the hybrid vehicle 100 of this embodiment is similar to that of the first embodiment. The drive power calculation portion 207 of this embodiment increases the drive power in a period from the start-up request of the engine 101 to immediately before the completion of the output of the drive power. More specifically, a predetermined first time period is started in the period from the start-up request of the engine 101 to immediately before the completion of the output of the drive power. Then, the drive power calculation portion 207 increases the requested drive power after the predetermined first time period has elapsed and before the output of the drive power is completed (before the passage of the second time period from the engine start-up request). The drive power calculation portion 207 calculates the drive power from the requested drive power that is increased, and accordingly the drive power is increased.

Figure 6:
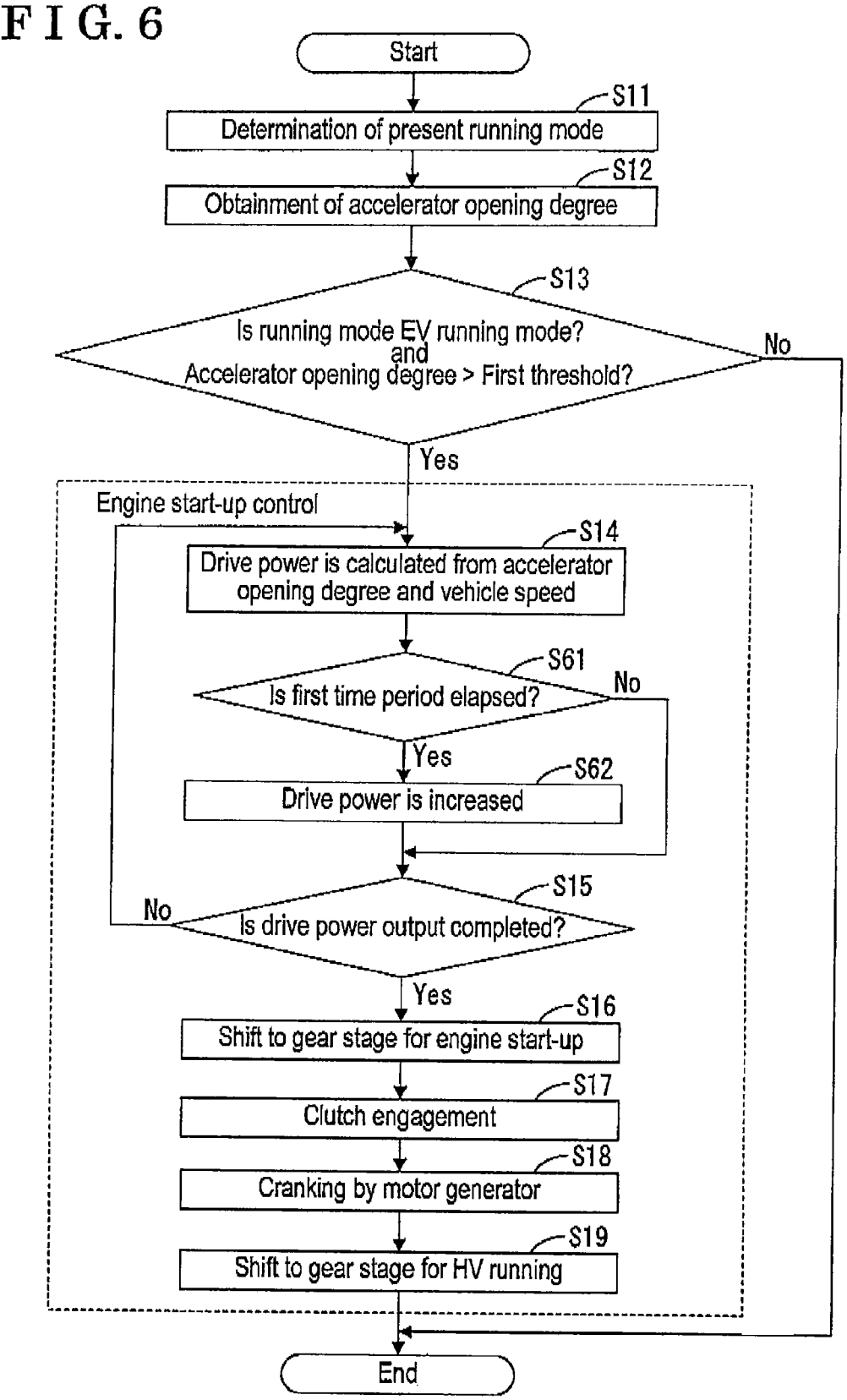
FIG. 6 is a flowchart showing a procedure of a drive control processing according to a second embodiment disclosed here.
Figure 7:
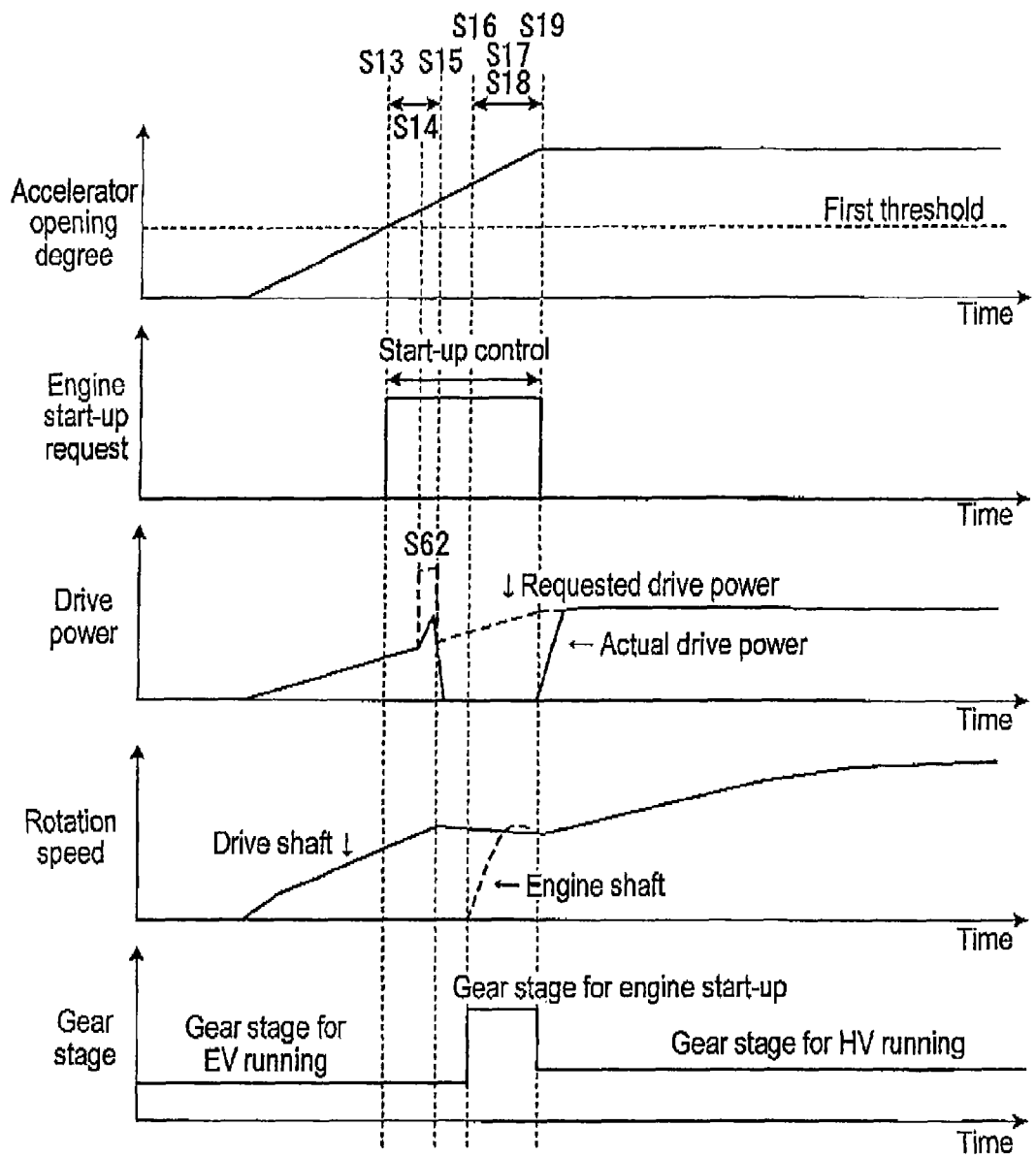
FIG. 7 is a graph showing a status of an accelerator opening degree, an engine start-up request, a drive power, a rotation speed, and a gear stage, at each step of the flowchart of FIG. 6.

FIG. 6 is a flowchart showing a procedure of a drive control processing according to the second embodiment. FIG. 7 is a graph showing a status of the accelerator opening degree, the engine start-up request, the drive power, the rotation speed and the gear stage, at each step of the flowchart of FIG. 6. In FIG. 7, the horizontal axis of the graph represents time and the vertical axis represents each of the accelerator opening degree, the engine start-up request, the drive power, the rotation speed and the gear stage.

The processings from the obtainment of the present running mode of the hybrid vehicle 100 to the calculation of the drive power at the engine start-up control (from Step S11 to Step S14) are executed in a similar manner to that of the first embodiment. After the calculation of the drive power, the drive power calculation portion 207 determines whether or not the predetermined first time period has passed (Step S61). In a case where the first time period has passed (Step S61: Yes), the drive power calculation portion 207 increases the calculated drive power as described above (Step S62). The increased drive power is transmitted as the motor torque command from the motor generator ECU 114 to the motor generator 102, and the motor generator 102 drives the drive shaft. As illustrated in FIG. 7, the requested drive power is increased in the period which is immediately before the completion of the drive power output, that is, at Step S62, and thus the drive power (an actual drive power) which is calculated in this period corresponds to a value higher than that in the first embodiment.

Then, in a similar manner to that in the first embodiment, the engine start-up control portion 206 determines whether or not the output of the drive power is completed (Step S15). In a case where the output of the drive power is not completed (Step S15: No), the processing returns to Step S14, and the calculation and the increase of the drive power by the drive power calculation portion 207 are repeated. By increasing the requested drive power, immediately before the completion of the drive power output, the drive power (the actual drive power) is increased. The processings from Step S16 to Step S19) are executed in a similar manner to that of the first embodiment.

As described above, in this embodiment, in a case where the engine start-up is requested when the hybrid vehicle 100 is stopped or is running in the EV running mode, the drive power to the drive shaft is calculated and the calculated drive power is increased immediately before the output of the drive power is completed. Then, the motor generator 102 drives the drive shaft at the increased drive power. Accordingly, from the state where the hybrid vehicle 100 is stopped or the state where the hybrid vehicle 100 is running in the EV running mode, when the accelerator is depressed and thus the engine is started up, the hybrid vehicle 100 is moved with a larger drive power immediately before the completion of the drive power output. Consequently, the driver's request for running the hybrid vehicle 100 is responded to more appropriately and accurately.

A third embodiment disclosed here will be described. In each of the first and second embodiments, the drive power relative to the drive shaft is calculated from the accelerator opening degree and the vehicle speed in a case where the engine start-up is requested. In the third embodiment, however, the drive power is derived on the basis of a maximum torque of the motor generator 102.

A configuration of the hybrid vehicle 100 of this embodiment is similar to that of the first embodiment. The drive power calculation portion 207 of this embodiment calculates the drive power on the basis of the maximum torque of the motor generator 102. More specifically, the drive power calculation portion 207 determines the maximum torque of the motor generator 102 as the requested drive power, and calculates the drive power from the requested drive power.

Figure 8:
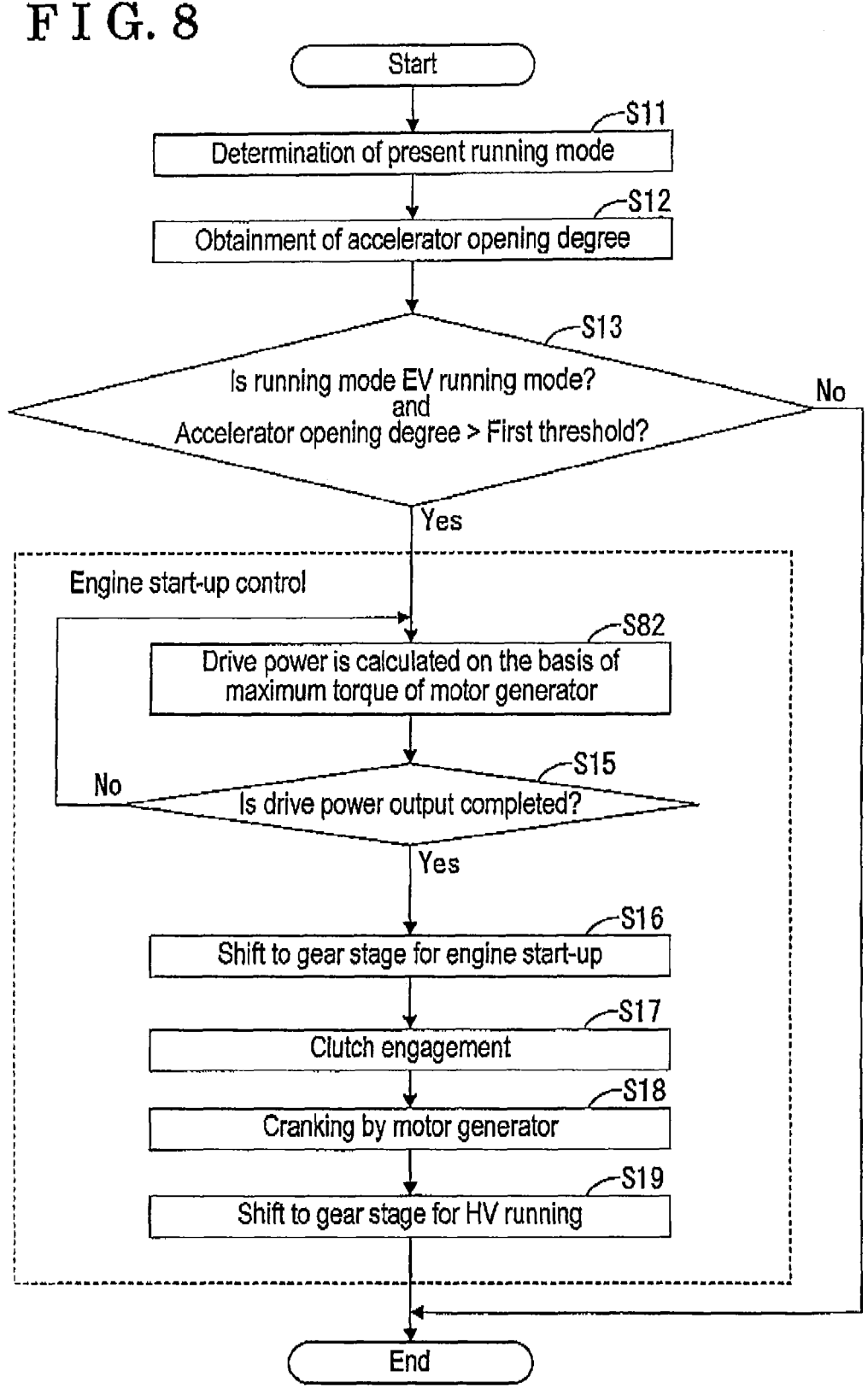
FIG. 8 is a flowchart showing a procedure of a drive control processing according to a third embodiment disclosed here.
Figure 9:
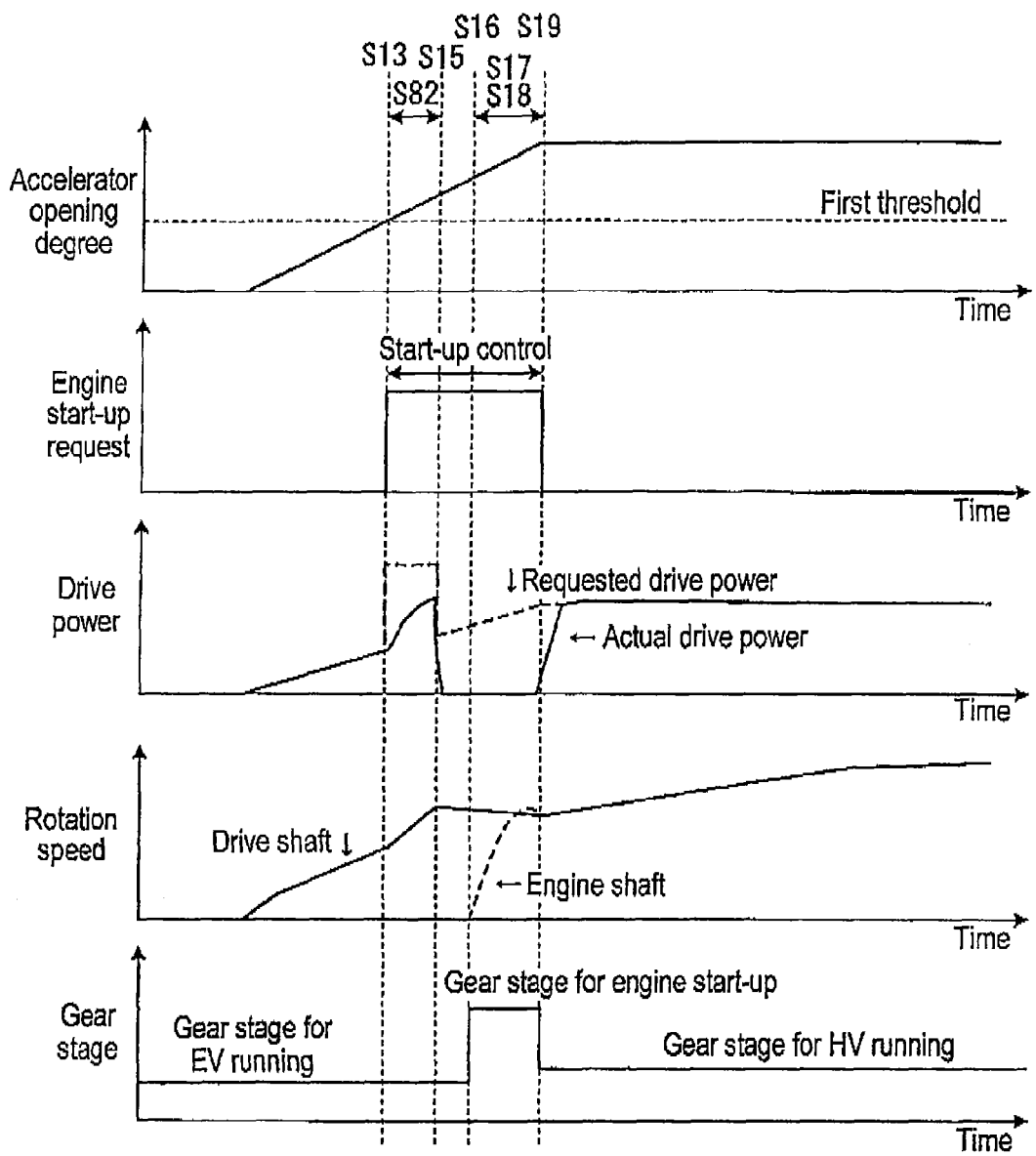
FIG. 9 is a graph showing a status of an accelerator opening degree, an engine start-up request, a drive power, a rotation speed, and a gear stage, at each step of the flowchart of FIG. 8.

FIG. 8 is a flowchart showing a procedure of a drive control processing according to the third embodiment. FIG. 9 is a graph showing a status of the accelerator opening degree, the engine start-up request, the drive power, the rotation speed and the gear stage, at each step of the flowchart of FIG. 8. In FIG. 9, the horizontal axis of the graph represents time and the vertical axis represents each of the accelerator opening degree, the engine start-up request, the drive power, the rotation speed and the gear stage.

The processings from the obtainment of the present running mode of the hybrid vehicle 100 to the determination of the present running mode and the determination of the accelerator opening degree (from Step S11 to Step S13) are executed in a similar manner to that of the first embodiment.

At Step S13, in a case where the running mode is the EV running mode and the accelerator opening degree is greater than the predetermined first threshold, and thus it is determined that the engine start-up is requested (Step S13: Yes), the start-up control of the engine 101 is started. The drive power calculation portion 207 determines the maximum torque of the motor generator 102 as the requested drive power, and calculates the drive power from the requested drive power (Step S82). As illustrated in FIG. 9, in a period of Step S82, the maximum torque of the motor generator 102 corresponds to the requested drive power. Accordingly, the drive power (the actual drive power) which is calculated in this period is a value higher than that in the first embodiment.

Then, the drive power is transmitted as the motor torque command by the engine start-up control portion 206 from the motor generator ECU 114 to the motor generator 102. Then, the motor generator 102 drives the drive shaft. The subsequent processings from Step S15 to Step S19 are executed in a similar manner to that in the first embodiment.

As described above, in this embodiment, in a case where the engine start-up is requested when the hybrid vehicle 100 is stopped or is running in the EV running mode, the drive power is calculated on the basis of the maximum torque of the motor generator 102 and the drive shaft is driven by the motor generator 102. Accordingly, from the state where the hybrid vehicle 100 is stopped or the state where the hybrid vehicle 100 is running in the EV running mode, when starting up the engine by pressing on the accelerator, the hybrid vehicle 100 is moved by the motor generator 102 with a larger drive power. Consequently, the driver's request for running the vehicle is responded to even more appropriately and accurately.

A fourth embodiment disclosed here will be described. In each of the first to third embodiments, the presence or absence of the engine start-up request is determined by the accelerator opening degree. In the fourth embodiment, however, whether or not the engine start-up request is made is determined by an accelerator opening speed.

A configuration of the hybrid vehicle 100 of this embodiment is similar to that of the first embodiment. The detection portion 202 of this embodiment inputs the accelerator opening degree from the accelerator opening sensor at every constant period of time and calculates the accelerator opening speed from plural values of the accelerator opening degree which are inputted at every constant period of time. Then, in a case where the accelerator opening speed is greater than a predetermined second threshold, the detection portion 202 determines that the start-up of the engine 101 is requested.

That is, the detection portion 202 determines that the engine start-up for the acceleration is requested in a case where a speed at which the driver presses on the accelerator is high.

Figure 10:
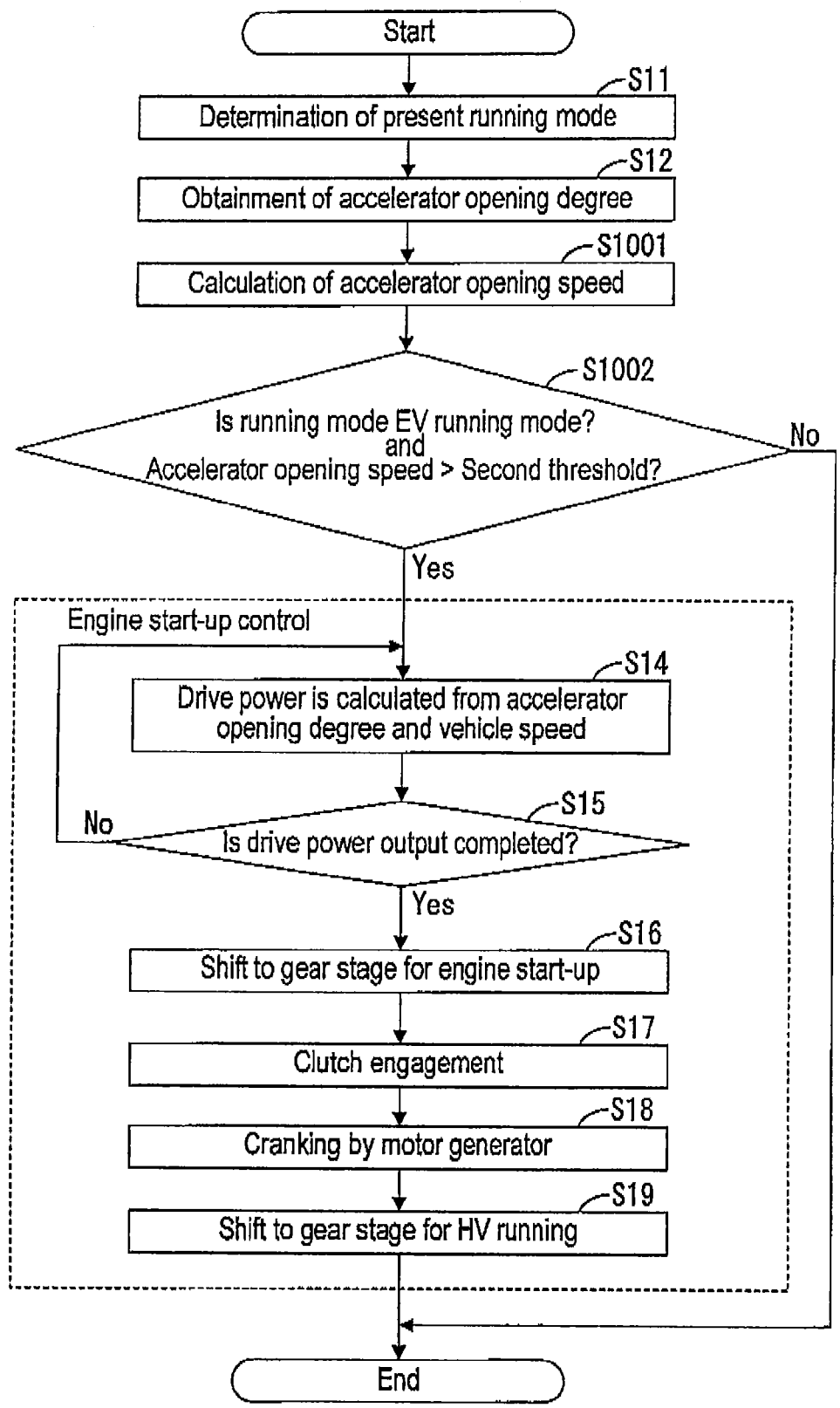
FIG. 10 is a flowchart showing a procedure of a drive control processing according to a fourth embodiment disclosed here.
Figure 11:
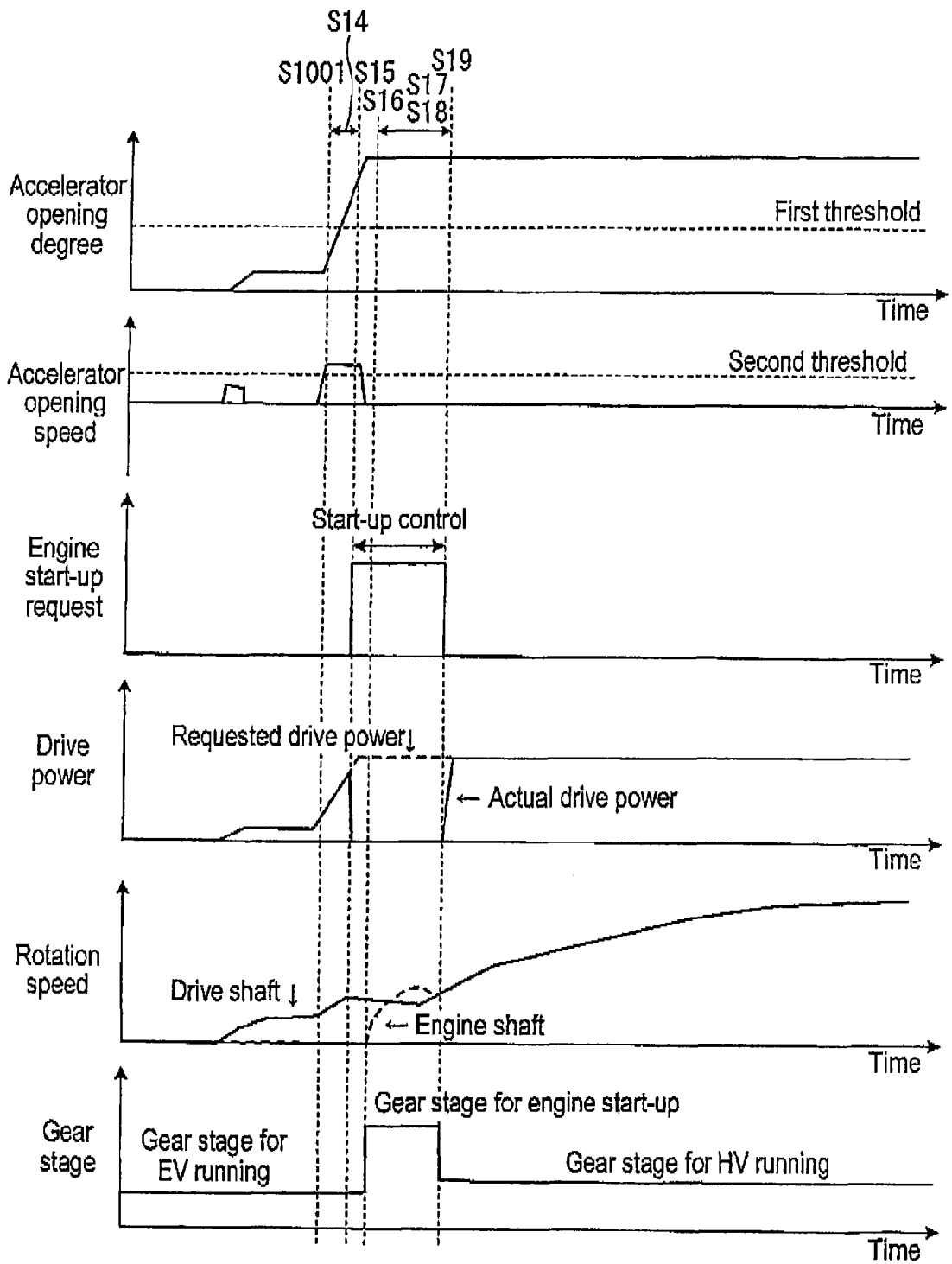
FIG. 11 is a graph showing a status of an accelerator opening degree, an accelerator opening speed, an engine start-up request, a drive power, a rotation speed, and a gear stage, at each step of the flowchart of FIG. 10.

FIG. 10 is a flowchart showing a procedure of a drive control processing according to the fourth embodiment. FIG. 11 is a graph showing a status of the accelerator opening degree, the accelerator opening speed, the engine start-up request, the drive power, the rotation speed and the gear stage, at each step of the flowchart of FIG. 10. In FIG. 11, the horizontal axis of the graph represents time and the vertical axis represents each of the accelerator opening degree, the accelerator opening speed, the engine start-up request, the drive power, the rotation speed and the gear stage.

First, in a similar manner to that of the first embodiment, the running mode determination portion 201 determines the present running mode of the hybrid vehicle 100 from the operation status of the engine 101 (Step S11). Then, the detection portion 202 obtains the accelerator opening degree from the accelerator opening sensor at every constant period of time (Step S12). Next, the detection portion 202 calculates the accelerator opening speed from the plural values of the accelerator opening degree which are obtained at every constant period of time (Step S1001).

Next, the detection portion 202 determines whether or not the present running mode is the EV running mode and the accelerator opening speed is greater than the predetermined second threshold (the engine start-up threshold) (Step S1002). In a case where the present running mode is the EV running mode and the accelerator opening speed is greater than the predetermined second threshold (Step S1002: Yes), the detection portion 202 determines that the engine start-up is requested. FIG. 11 illustrates a case where the accelerator opening speed is greater than the second threshold. Hereafter, the engine start-up control of the engine 101 is started. The subsequent processings of the engine start-up control (from Step S14 to Step S19) are executed in a similar manner to that of the first embodiment.

At Step S1002, in a case where the running mode is the HV running mode, or the accelerator opening speed is equal to or smaller than the second threshold (Step S1002: No), the detection portion 202 determines that the engine start-up request is not made, and ends the processing.

As described above, the presence or absence of the engine start-up request is determined by the accelerator opening speed in this embodiment. Thus, in a case where, from the EV running mode, the accelerator is depressed and thus the engine is started up, the driver's request for running the hybrid vehicle 100 is responded to more appropriately and accurately.

This disclosure is not limited to the aforementioned embodiments. The embodiments are presented as examples and are not provided to intend to limit the scope of the disclosure. The embodiments may be implemented in various manners other than the presented examples, and various omissions, substitution and changes may be provided without departing from the scope of the disclosure. The embodiments and the variations thereof are included in the scope and/or spirits of the disclosure, and are encompassed in the disclosure recited in the scope of claims and in a range of equivalents thereof.

For example, in each of the first to fourth embodiments, it is determined that the output of the drive power is completed in a case where the predetermined second time period passes or elapses from the time point of the start-up request of the engine 101, however, determination is not limited thereto. For example, the engine start-up control portion 206 may be configured so that acceleration, that is accelerated velocity of the hybrid vehicle 100 is calculated from the accelerator opening degree which is inputted from the accelerator opening sensor and/or the vehicle speed which is inputted from the vehicle speed sensor. Then, the engine start-up control portion 206 may be configured so that the completion of the output of the drive power is determined in a case where the acceleration of the hybrid vehicle 100 is equal to or greater than a predetermined target acceleration, that is, in a case where the acceleration of the hybrid vehicle 100 reaches the predetermined target acceleration. Accordingly, in a case where the engine 101 is started up from the EV running mode, the completion of the output of the drive power is determined more accurately.

In this case, the engine start-up control portion 206 may be configured so that the target acceleration is increased or decreased in a case where the hybrid vehicle 100 is running on an inclined surface, including, for example, a slope way. For example, the engine start-up control portion 206 may be configured so that the target acceleration is decreased in a case where it is detected that the hybrid vehicle 100 is running on an uphill road and the target acceleration is increased in a case where it is detected that the hybrid vehicle 100 is running on a downhill road.

In addition, the engine start-up control portion 206 may be configured so that a rotation speed of the driving wheels FR, FL, for example, a rotation speed of each of the driving wheels FR, FL, is detected, and so that it is determined the output of the drive power is completed in a case where the rotation speed is equal to or greater than a predetermined threshold (i.e., a predetermined third threshold). In this case, the completion of the output of the drive power is determined by that the hybrid vehicle 100 has moved in a direction which is requested by the driver.

According to the aforementioned embodiments, the control apparatus 300 includes the running mode determination portion 201 determining whether the hybrid vehicle 100 is running by using the motor generator 102 as the power source without using the engine 101 or the hybrid vehicle 100 is running by using both of the engine 101 and the motor generator 102 as the power source, on the basis of the operation status of the engine 101, the detection portion 202 detecting the start-up request of the engine 101, the drive power calculation portion 207 calculating the requested drive power in a case where it is detected that the hybrid vehicle 100 is running by using the motor generator 102 as the power source without using the engine 101 and the start-up request of the engine 101 is detected, and the engine startup control portion 206 driving the drive shafts 121a, 121b and the differential 120 by outputting the drive power by means of the motor generator 102 at the start-up of the engine 101, the engine start-up control portion 206 rotating the engine 101 and causing the hybrid vehicle 100 to run by using both of the engine 101 and the motor generator 102 as the power source after the output of the drive power is completed.

According to the above-described configuration, for example, in a case where the engine 101 is started from the state where the hybrid vehicle 100 is stopped or the state where the hybrid vehicle 100 is running by using the motor generator 102 as the power source without using the engine 101, the driver's request for running the hybrid vehicle 100 is responded to or met appropriately and accurately. In addition, the clutch 103, which connects and disconnects the motor generator 102 and the drive shaft relative to each other, is readily prevented from being heated.

According to the aforementioned embodiments, the control apparatus 300 includes the drive power calculation portion 207 calculating the drive power in a case where the start-up request of the engine 101 is generated when the hybrid vehicle 100 is running by using only the motor generator 102 as the power source, and the engine start-up control portion 206 driving the drive shaft 121a, 121b and the differential 120 by outputting the drive power by means of the motor generator 102 at the start-up of the engine 101, the engine start-up control portion 206 rotating the engine 101 and causing the hybrid vehicle 100 to run by using both of the engine 101 and the motor generator 102 as the power source after the output of the drive power is completed.

According to the above-described configuration, for example, in a case where the engine 101 is started from the state where the hybrid vehicle 100 is running by using only the motor generator 102 as the power source, the driver's request for running the hybrid vehicle 100 is responded to appropriately and accurately. In addition, the clutch 103, which connects and disconnects the motor generator 102 and the drive shaft relative to each other, is readily prevented from being heated.

According to the aforementioned embodiments, the detection portion 202 detects the accelerator opening degree provided by the driver, and determines that the start-up request of the engine 101 is made in a case where the accelerator opening degree is greater than the predetermined first threshold.

According to the above-described configuration, for example, in a case where the accelerator is depressed and the engine 101 is started from the state where the hybrid vehicle 100 is stopped or the state where the hybrid vehicle 100 is running by using the motor generator 102 as the power source without using the engine 101, the driver's request for running the hybrid vehicle 100 is responded to appropriately and accurately. In addition, the clutch 103, which connects and disconnects the motor generator 102 and the drive shaft relative to each other, is readily prevented from being heated.

According to the aforementioned embodiments, the detection portion 202 detects the accelerator opening degree provided by the driver, and determines that the start-up request of the engine 101 is made in a case where the accelerator opening speed based on the accelerator opening degree is greater than the predetermined second threshold.

According to the above-described configuration, for example, in a case where the accelerator is depressed and the engine 101 is started from the state where the hybrid vehicle 100 is stopped or the state where the hybrid vehicle 100 is running by using the motor generator 102 as the power source without using the engine 101, the driver's request for running the hybrid vehicle 100 is responded to appropriately and accurately.

According to the aforementioned embodiments, the drive power calculation portion 207 calculates the drive power on the basis of the accelerator opening degree and the vehicle speed.

According to the above-described configuration, for example, in a case where the accelerator is depressed and the engine 101 is started from the state where the hybrid vehicle 100 is stopped or the state where the hybrid vehicle 100 is running by using the motor generator 102 as the power source without using the engine 101, the driver's request for running the hybrid vehicle 100 is responded to appropriately and accurately.

According to the aforementioned embodiments, the drive power calculation portion 207 increases the drive power from the start-up request of the engine 101 before the completion of the output of the drive power.

According to the above-described configuration, for example, in a case where the engine 101 is started in the state where the hybrid vehicle 100 is stopped or the state where the hybrid vehicle 100 is running by using the motor generator 102 as the power source without using the engine 101, the hybrid vehicle 100 is moved with a greater drive power, immediately before the completion of the output of the driving power. Consequently, the driver's request for running the hybrid vehicle 100 is responded to appropriately and accurately.

According to the aforementioned embodiments, the drive power calculation portion 207 calculates the drive power on the basis of the maximum torque of the motor generator 102.

According to the above-described configuration, for example, in a case where the engine 101 is started from the state where the hybrid vehicle 100 is stopped or the state where the hybrid vehicle 100 is running by using the motor generator 102 as the power source without using the engine 101, the hybrid vehicle 100 is moved with the greater drive power. Consequently, the driver's request for running the hybrid vehicle 100 is responded to appropriately and accurately.

According to the aforementioned embodiments, the engine start-up control portion 206 determines that the output of the drive power is completed in any one of cases where the predetermined second time period elapses from the start-up request of the engine 101, where the acceleration of the hybrid vehicle 100 reaches the predetermined target acceleration and where the rotation speed of the driving wheel FR, FL of the hybrid vehicle 100 is greater than the predetermined threshold.

According to the above-described configuration, for example, in a case where the engine 101 is started from the state where the hybrid vehicle 100 is stopped or the state where the hybrid vehicle 100 is running by using the motor generator 102 as the power source without using the engine 101, the driver's request for running the hybrid vehicle 100 is responded to appropriately and accurately.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle control apparatus comprising:
a determination portion determining whether a vehicle is using a motor as a power source without using an engine or the vehicle is using both of the engine and the motor as the power source, on the basis of an operation status of the engine;
a detection portion detecting a start-up request of the engine;
a drive power calculation portion calculating a requested drive power in a case where it is detected that the vehicle is using the motor as the power source without using the engine and the start-up request of the engine is detected; and
an engine start-up control portion driving a drive shaft by outputting the drive power by means of the motor at a start-up of the engine, the engine start-up control portion connecting the engine and the motor after the output of the drive power is completed and rotating the engine by cranking the engine by the motor and causing the vehicle to use both of the engine and the motor as the power source.

2. The vehicle control apparatus according to claim 1, wherein the detection portion detects an accelerator opening degree provided by a driver, and determines that the start-up request of the engine is made in a case where the accelerator opening degree is greater than a predetermined first threshold.

3. The vehicle control apparatus according to claim 2, wherein the drive power calculation portion calculates the drive power on the basis of the accelerator opening degree and a vehicle speed.

4. The vehicle control apparatus according to claim 1, wherein the detection portion detects an accelerator opening degree provided by a driver, and determines that the start-up request of the engine is made in a case where an accelerator opening speed based on the accelerator opening degree is greater than a predetermined second threshold.

5. The vehicle control apparatus according to claim 1, wherein the drive power calculation portion increases the drive power from the start-up request of the engine before the completion of the output of the drive power.

6. The vehicle control apparatus according to claim 1, wherein the drive power calculation portion calculates the drive power on the basis of a maximum torque of the motor.

7. The vehicle control apparatus according to claim 1, wherein the engine start-up control portion determines that the output of the drive power is completed in any one of cases where a predetermined second time period elapses from the start-up request of the engine, where acceleration of the vehicle reaches a predetermined target acceleration and where rotation speed of a driving wheel of the vehicle is greater than a predetermined third threshold.

8. The vehicle control apparatus according to claim 1, further comprising:
a transmission portion transmitting a torque outputted from the engine and the motor to the drive shaft; wherein
the engine start-up control portion shifts a gear stage to a gear stage for engine start-up so that the engine and the motor are connected to each other when connecting the engine and the motor.

9. The vehicle control apparatus according to claim 1, further comprising:
a clutch being controlled to engage and disengage the engine and the drive shaft; wherein
the start-up control portion drives the drive shaft by outputting the drive power by means of the motor in a disengaged state of the clutch at the start-up of the engine, the engine start-up control portion connects the engine and the motor in response to engagement of the clutch after the output of the drive power is completed and rotates the engine by cranking the engine by the motor to transmit a torque outputted from the engine to the drive shaft, and causing the vehicle to run by using both of the engine and the motor as the power source.

10. A vehicle control apparatus comprising:
a drive power calculation portion calculating a drive power in a case where a start-up request of an engine is generated when a vehicle is using only a motor as a power source; and
an engine start-up control portion driving a drive shaft by outputting the drive power by means of the motor at a start-up of the engine, the engine start-up control portion connecting the engine and the motor after the output of the drive power is completed and rotating the engine by cranking the engine by the motor and causing the vehicle to use both of the engine and the motor as the power source.

11. The vehicle control apparatus according to claim 10, wherein the drive power calculation portion increases the drive power from the start-up request of the engine before the completion of the output of the drive power.

12. The vehicle control apparatus according to claim 10, wherein the drive power calculation portion calculates the drive power on the basis of a maximum torque of the motor.

13. The vehicle control apparatus according to claim 10, further comprising:
a transmission portion transmitting a torque outputted from the engine and the motor to the drive shaft; wherein
the engine start-up control portion shifts a gear stage to a gear stage for engine start-up so that the engine and the motor are connected to each other when connecting the engine and the motor.

14. The vehicle control apparatus according to claim 10, further comprising:
a clutch being controlled to engage and disengage the engine and the drive shaft; wherein
the start-up control portion drives the drive shaft by outputting the drive power by means of the motor in a disengaged state of the clutch at the start-up of the engine, the engine start-up control portion connects the engine and the motor in response to engagement of the clutch after the output of the drive power is completed and rotates the engine by cranking the engine by the motor to transmit a torque outputted from the engine to the drive shaft, and causing the vehicle to run by using both of the engine and the motor as the power source.

* * * * *